United States Patent [19]

Farrer

[11] 4,355,353
[45] Oct. 19, 1982

[54] POWER SUPPLY APPARATUS

[75] Inventor: Michael Farrer, Bishops Stortford, England

[73] Assignee: Gould Advance Limited, Hainairt, England

[21] Appl. No.: 222,692

[22] Filed: Jan. 5, 1981

[51] Int. Cl.³ .......................................... H02M 3/335
[52] U.S. Cl. ........................................ 363/21; 363/56
[58] Field of Search .................................. 363/18–21, 363/55–58, 85, 97, 124, 131

[56] References Cited
U.S. PATENT DOCUMENTS 3,924,172  12/1975  Gregorich ............................ 363/21
3,963,973   6/1976  Vermolen ............................. 363/20

Primary Examiner—William M. Shoop
Assistant Examiner—Peter S. Wong
Attorney, Agent, or Firm—Laubscher, Philpitt & Laubscher

[57] ABSTRACT

A forward converter circuit (FIG. 1) is provided with a transformer reset sensing circuit (FIG. 2) whereby base drive to the switching transistor TR1 is inhibited until after reset of the transformer T1. The reset sensing circuit includes a sensing winding T1d provided on the transformer for sensing the waveform at the primary winding T1a, a comparator IC1 and diodes D5, D4 connected in such a way that one input of the comparator is high when the waveform changes in one direction, and the other input of the comparator is high when the waveform changes in the other direction. The output of the comparator inhibits switching of the transistor before reset and thus allows the use of a maximum switching duty cycle of 50% without risk of transformer saturation.

7 Claims, 5 Drawing Figures

POWER SUPPLY APPARATUS

The present invention relates to power supply apparatus, and in particular to such apparatus operating in the switching mode, conveniently termed converter apparatus.

BRIEF DESCRIPTION OF THE PRIOR ART

Converter apparatus typically switches a unidirectional source of current at a relatively high frequency through one or more windings of a transformer. An output winding of the transformer provides an alternating current which may be rectified to produce a D.C. source of power. An example of such apparatus is the so-called forward converter wherein a single semiconductor switch such as a transistor switches current through one winding of a transformer. An output winding provides the alternating current in response alternately to a build-up of flux in the transformer when the transistor is turned on, and to a collapse of the flux when the transistor is turned off. This results in an e.m.f. being induced in the first winding in the opposite sense when the transistor is off, and if the transistor is then switched on before this e.m.f. starts to reduce, this condition being termed "re-set" of the transformer, saturation of the transformer may occur due to unequal voltage-time integrals being impressed on the transformer by portions of the switched waveform having opposite polarities.

SUMMARY OF THE INVENTION

In accordance with the present invention, there is provided converter apparatus comprising a unidirectional source of current, a transformer having a primary winding connected to said source and a secondary winding connected to an output, a switching means responsive to control signals at a control terminal thereof to provide a switchable current path from the source through said primary winding whereby periodic switching of said switching means produces an induced voltage at said output, and transformer reset sensing means for sensing reset of said transformer and for inhibiting switching of said switching means until reset of said transformer, whereby to avoid saturation of said transformer.

BRIEF DESCRIPTION OF THE DRAWINGS

Features and advantages of the present invention will become apparent from the following description of an embodiment thereof, given by way of example, when taken in conjunction with the accompanying drawings, in which.

DETAILED DESCRIPTION

Figure 1:
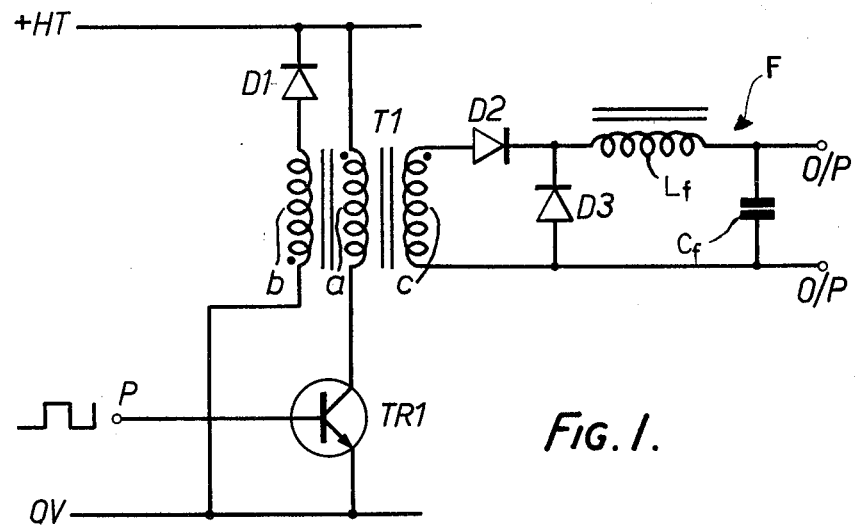
FIG. 1 shows a circuit of one form of forward converter.

Referring to FIG. 1, a transistor TR1 is connected so as to switch a unidirectional supply of current HT through a winding T1a of a transformer T1. Base drive pulses are applied through a terminal P to the base of the transistor TR1 so as to control switching thereof. A winding T1b of the transformer is connected across the supply HT, in the opposite sense to winding T1a, via a diode D1. A further winding T1c of the transformer acts as an output and has a diode D2 connected as shown to rectify the alternating output, and a flywheel diode D3 connected across the winding T1c and diode D2. A filtering and smoothing circuit F includes an inductor LF and capacitor CF which provides a smoothed and filtered D.C. output at output terminals O/P.

In operation, base drive pulses applied to the base of transistor TR1 via terminal P turn the transistor on. A current flows through winding T1a, a resulting current being induced in winding T1c, and power is delivered to a load connected to the output O/P. When the transistor turns off, the diode D2 is reverse biassed and the flywheel diode D3 conducts. As a result, the collector voltage of the transistor goes higher than the voltage of the positive supply terminal +HT until the diode D1 conducts and the voltage is clamped. When the number of turns on winding T1a equals the number of turns on winding T1b, the collector "overswing" voltage is clamped at twice the voltage of the power supply. This voltage will remain substantially constant until the voltage-time integral of the turn-off portion of the switched waveform approaches that of the preceding turn-on portion, when the voltage will start to reduce and the transformer is reset.

For the condition described above, wherein the turns ratio between windings T1a and T1b is unity, the amplitudes of the two portions of the waveform will be approximately equal and hence the transformer reset will normally occur after a period of turn-off of the transistor approximately equal to the period of turn-on thereof, assuming a reasonably constant load requirement. A problem is that since reset of the transformer should be guaranteed before the next turn-on of the transistor can occur in order to prevent the above-mentioned transformer saturation, the absolute maximum duty cycle of the switched current through winding T1a is 50%. In practice, this means that the maximum duty cycle of the base drive pulses will be set to say 45% in order to ensure that there is always a sufficient period for the transformer to reset, even with inaccuracies in setting and variations of the transistor turn-off storage time. This results in an inefficient utilization of components in that the theoretical maximum power transfer of any given converter will never be practically realized in order to comply with the transformer reset requirement under a wide variety of conditions.

Figure 2:
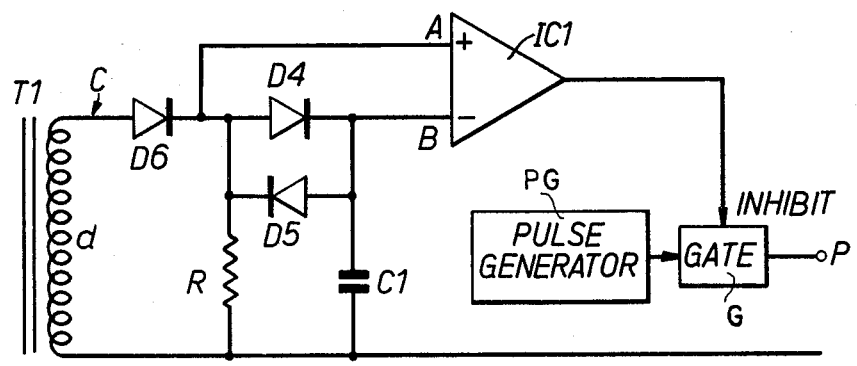
FIG. 2 shows one embodiment of a control circuit to be used with the converter of FIG. 1.

FIG. 2 shows a control circuit used with the circuit of FIG. 1 and which inhibits switch-on of the transistor until the transformer has reset. The control circuit allows the maximum duty cycle of the base drive pulses to be set above 50%, for example at 55%, and compensates for this to provide a balanced waveform of equal mark to space ratio through the transformer thereby preventing saturation, but allowing maximum power transfer.

A further winding T1d is provided on the transformer T1 in order to sense the waveform of the voltage at winding T1a. The winding T1d may comprise just one turn, assuming that the e.m.f. induced is sufficient for the rest of the circuit. This includes an operational amplifier connected as a comparator IC1 having a non-inverting input A and an inverting input B, diodes D4 and D5 connected in inverse-parallel to the input B, diode D6 rectifying a signal C from the winding T1d for the input A and remaining terminals of the diodes D4 and D5, and a capacitor C1 providing hysteresis for the circuit. The output of comparator IC1 is used to inhibit a gate G which is included between a pulse generator PG for providing base drive pulses and the terminal P connected to the base of the transistor TR1 as shown in FIG. 1. The pulse generator and gate are shown schematically for simplifying the following description of the circuit opoeration; however they need not be present as separate circuit elements. For example, the inhibit output of IC1 could be made directly effective on the pulse generator to suppress pulses or parts thereof which would otherwise be generated.

The operation of the control circuit will be explained with reference to the waveforms of FIGS. 3, 4 and 5. The principle underlying the circuit is that diode D5 conducts when the waveform at point C is in the negative going direction and holds input B of IC1 high, thereby providing a low inhibit output of IC1; conversely when the waveform at point C is in the positive going direction, diode D4 conducts and holds input A of IC1 high, thereby providing a high inhibit output of IC1.

Figure 3:
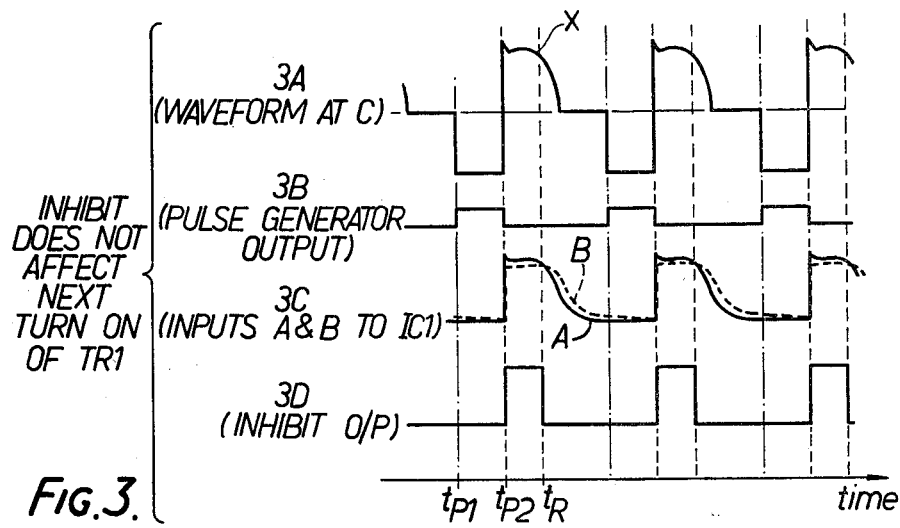
FIGS. 3, 4 and 5 show waveforms at various parts of the control circuit of FIG. 2 under various operating conditions.

Referring to FIG. 3, the waveforms shown correspond to operation of the circuit where the turn-on period of the transistor, as controlled by base drive pulses from the generator, is less than 50% of each cycle. Base drive is applied between time $t_{P1}$ and $t_{P2}$ (3B) and turns on the transistor during this period, as shown in waveform 3A. At turn-off, the collector voltage rises to its clamped value, and starts reducing to point x at time $t_R$, i.e. the transformer is reset at this time. As the voltage starts reducing, input B of IC1 goes higher than input A (shown in 3C), and the inhibit output (3D), which went high upon turn-off of the transistor, returns to its lower value. It will be seen that in this mode of operation, the base drive will not be applied to switch the transistor on before the transformer has reset, andtherefore the inhibit waveform 3D will not act to modify the base drive pulses fed to the transistor. In fact waveform 3A also represents operation of the circuit shown in FIG. 1 wihtout the control circuit of FIG. 2, as long as the duty cycle of the base drive pulses is less than 50%.

Figure 4:
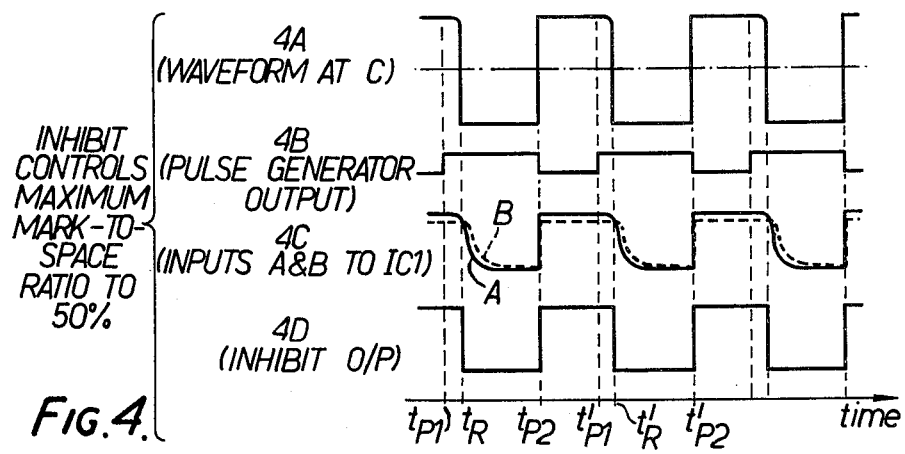

FIG. 4 illustrates a condition where the pulse generator is providing pulses to switch the transistor on for a period greater than 50% of each cycle, as shown by waveform 4B. Base drive is generated at a time $t_{P1}$ and removed at a time $t_{P2}$. At a time $t_R$, the transistor is switched on in response to the reset sensing mechanism (4C) and consequent removal of the inhibit output 4D. Base drive is removed at time $t_{P2}$ and the transistor turns off. Base drive is next generated at time $t'_{P1}$ (waveform 4B) but the inhibit output (4D) prevents it passing through the gate and to the base of the transistor until transformer reset has been sensed at time $t'_R$ (as shown in 4C), whereupon the inhibit is removed (4D) and the transistor turns on (4A). Accordingly, the circuit provides a 50% on-50% off cycle, despite the generation of base drive pulses having a duty cycle greater than 50%.

Figure 5:
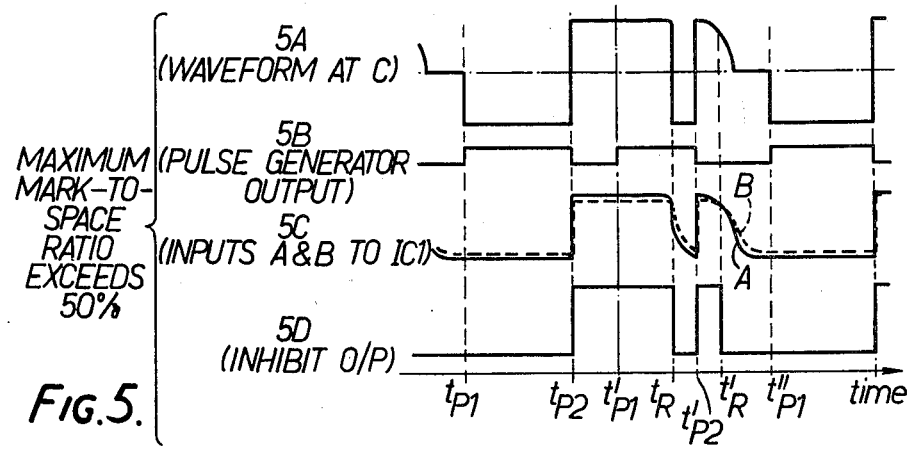

FIG. 5 shows a transient condition, for example at initial switch-on of the converter, or alternatively during a change of duty cycle as might occur in a pulse-width modulation controlled converter. The transistor is initially turned on between times $t_{P1}$ and $t_{P2}$ in response to a base drive pulse of similar length (waveform 5B). After a relatively short period, a second base drive pulse is generated at time $t_{P1'}$. However, as the transformer has not yet reset, the inhibit output (5D) prevents turn-on of the transistor until the reset time $t_R$.

The base drive pulse is removed at time $t_{P2'}$, therefore the transistor turns off. Reset of the transformer then occurs at time $t_R$, and the circuit awaits the next base drive pulse for turn-on of the transistor at time $t_{P1''}$. Once the period of the base drive pulses has stabilized to a constant value, a steady-state condition as shown in FIG. 4 will be achieved, the duty cycle being held to 50% irrespective of the mark to space ratio of the generated base drive pulses.

The above-described circuit is particularly advantageous in that the maximum mark to space ratio of the base drive pulses does not need accurate setting to a value of less than 50% as is otherwise necessary to ensure resetting of the transformer. This means that the transformer and other components are utilized as fully as possible by being allowed to operate at 50% maximum duty cycle. If the mark to space ratio of a base drive pulse exceeds this value, the circuit compensates for this during the next cycle and effectively holds the output at 50% duty cycle, thereby preventing saturation of the transformer. The transformer is always reset no matter how far over 50% the mark may go, providing the transformer can hold off the resulting extra voltage-time integral factor without saturating.

Although the above description assumes that the turns ratio between windings T1a and T1b is unity and that therefore the upper collector voltage of the transistor is clamped to twice the supply voltage, this need not necessarily be the case. For instance if the turns ratio of T1a:T1b is 2:1, the reset voltage will be clamped at three times the supply voltage. In this case the maximum duty cycle will be 66.6%, this value providing balance between opposite voltage-time integrals of the waveform at C. In general if the turns ratio of T1a:T1b is M:N, the maximum duty cycle will be M/(M+N).

The circuit is particularly suitable for pulse width modulation control of the converter. The width of the base drive pulses may be varied to control the duty cycle of the output of the transformer and hence the magnitude of the rectified output voltage. The base drive pulse generator may be made responsive to a parameter such as the output voltage of the converter, and thereby compensate for both variations in the input power supply and the load. The control circuit will enable maximum power transfer through the converter by allowing the base drive maximum mark to space ratio to be set to a value greater than 50%, the control circuit compensating for this to provide a maximum 50% switching cycle.

FIG. 2 shows an arrangement wherein the comparator IC1 generates an inhibit signal which inhibits passage through a schematic gate of base drive pulses from the generator. Where an "open collector" device is used for the comparator IC1, the polarities of the inputs A and B may be reversed, and the output of the comparator connected directly to the base of transistor TR1. The inhibit signal produced at the output of the comparator then "sinks" any base drive pulse arriving from the generator thereby preventing turn on of the transistor.

What is claimed is:

1. In a converter apparatus having a source of unidirectional current (HT, OV) a transformer (T1) including a primary winding (T1a) and an output winding (T1c), switching means (TR1) connecting said primary winding with said current source, and control means (PG) for periodically operating said switching means between conductive and non-conductive conditions, thereby to induct an alternating-current output voltage across said output winding;

the improvement which comprises (a) inhibiting means (G) normally inhibiting operation of said control means; and (b) sensing means (T1d) responsive to the initiation of transformer reset for disabling said inhibiting means, thereby to permit operation of the apparatus at maximum duty cycle without the risk of transformer saturation.

2. Apparatus as defined in claim 1, wherein said inhibiting means includes a gate (G) operable between open and closed conditions, and cmparator means (Ic1) responsive to the waveform (C) of the primary winding for normally supplying an inhibiting signal to said gate to maintain the same in the open condition.

3. Converter apparatus as claimed in claim 1, wherein said transformer includes a further winding (T1b) connected to said unidirectional source of current and to a voltage clamping means (D1), whereby the voltage at said primary winding rises to an "overswing" value greater than that of said source upon switching off of the switching means.

4. Converter apparatus as claimed in claim 3, wherein said transformer reset sensing means is responsive to a negative rate of change of said voltage "overswing" value to sense reset of said transformer.

5. Converter apparatus as claimed in claim 4, wherein said transformer reset sensing means includes a reset sensing winding (T1d) provided on said transformer for sensing the waveform of said primary winding, a cmparator (Ic1) connected to said reset sensing winding, and rectifying means (D4, D5) connected between said comparator and said reset sensing winding and so operable that a first input of said comparator is high in response to said waveform changing in one direction, and a second input of said comparator is high in response to said waveform changing in the other direction.

6. Converter apparatus as claimed in claim 3 wherein the turns ratio between said primary winding and said further winding is M:N, the maximum duty cycle of conductive to non-conductive periods of said switching means being M/(M+N).

7. Converter apparatus as claimed in claim 6, wherein the turns ratio between said primary winding and said further winding is 1:1, said maximum duty cycle being 50%.

* * * * *